July 8, 1969   N. E. WELLS   3,454,099
ADJUSTABLE MOUNT FOR CROP-DIGGING WHEELS
Filed June 10, 1966
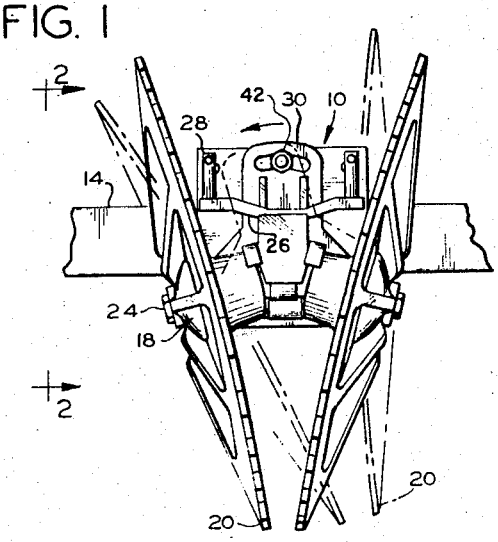
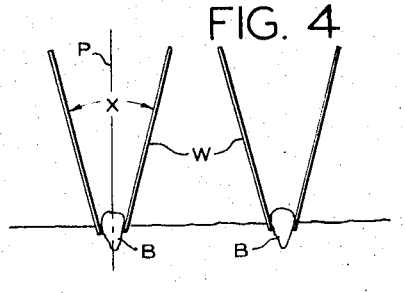
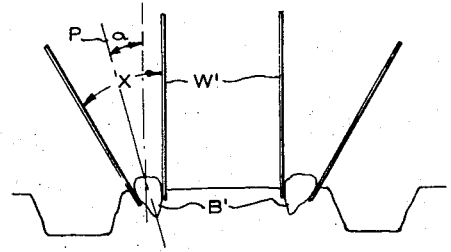
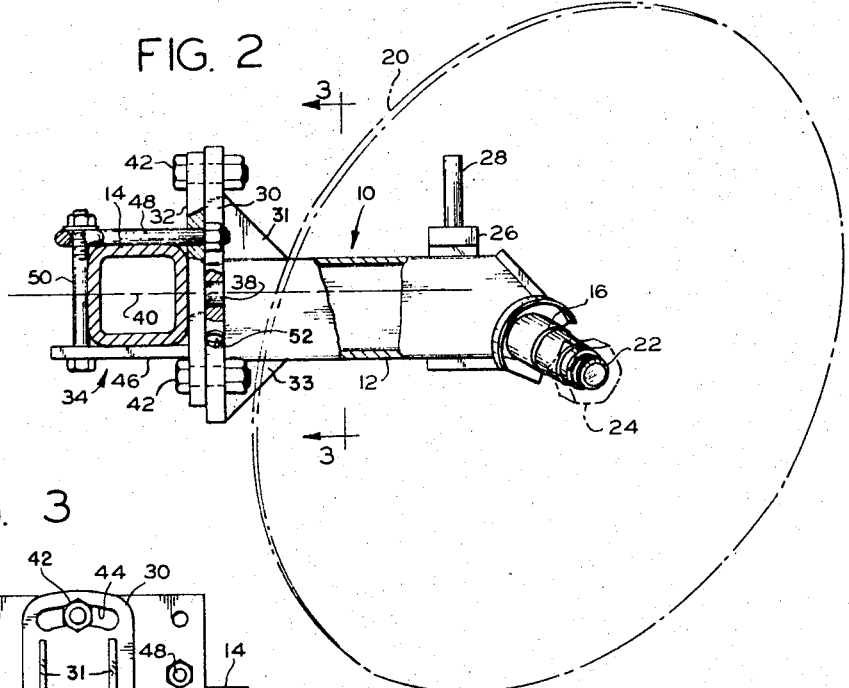
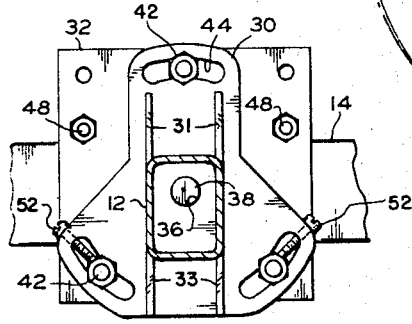
NOVELL E. WELLS
INVENTOR
BY
BUCKHORN, BLORE, KLARQUIST & SPARKMAN
ATTORNEYS United States Patent Office
3,454,099
Patented July 8, 1969

3,454,099
ADJUSTABLE MOUNT FOR CROP-DIGGING WHEELS
Novell E. Wells, 927 Ranch Road,
Boise, Idaho 83702
Filed June 10, 1966, Ser. No. 556,626
Int. Cl. A01d 25/04
U.S. Cl. 171—58                 12 Claims

ABSTRACT OF THE DISCLOSURE

An adjustable mount for a pair of row crop-digging wheels which permits adjustment of the angularity of the pair of wheels with respect to the ground for picking up a row of beets or the like growing at an angle to the vertical, without changing the angularity of the pair of wheels with respect to each other.

The present invention relates to row crop harvesters and more particularly to an improved adjustable mount for the crop-digigng wheels of beet harvesters and other harvesting implements.

Beets are usually grown in flat beds in regions that do not require irrigation, and under such circumstances the beets will grow vertically in the soil and therefore will be disposed substatially vertically when ready for harvest. However, in ares under irrigation beets are commonly grown in elevated beds separated by parallel irrigation troughs. Beets growing in rows adjacent the edges of such beds tend to grow at an angle to the vertical toward the adjacent trough. Under such circumstances all of the beets in an edge row will be tilted at approximately the same inclination at harvest time. Thus, in the past harvesting such bed row beets with digging wheels disposed for lifting vertically growing beets has resulted in loss or damage to a large portion of the beet crop through the slicing in two of individual beets, with part of each beet being left in the soil.

Accordingly a primary object of the present invention is to provide an adjustable mount for crop-digging wheels which permits adjustment of the wheels from a position for harvesting upright plants to a position for harvesting plants growing at an inclination to the vertical.

Another important object is to provide an adjustable beet-digging wheel mount as aforesaid which permits adjustment of the angular disposition of a pair of wheels while maintaining the necessary angular relationship between the wheels for lifting the beets from the soil.

Still another important object is to provide an adjustable mount as aforesaid which enables adjustment of a pair of beet-digging wheels about an axis extending longitudinally of the harvester without disturbing appreciably the transverse, vertical and longitudinal positioning of the pair of wheels with respect to the harvester.

A further object is to provide an adjustable mount for crop-digging wheels as aforesaid which is simple and inexpensive to manufacture, and easy to install and adjust on a harvester.

The above and other objects and advatages will become more apparent from the following detailed description which proceeds with reference to the accompanying drawing wherein:

FIG. 1 is a front elevational view of a pair of beet-digging wheels mounted on an adjustable strut in accordance with the invention;

FIG. 2 is an enlarged side elevational view of the adjustable strut taken along the line 2—2 of FIG. 1, but with the digging wheels shown in phantom and parts broken away for clarity;

FIG. 3 is a vertical sectional view on the same scale as FIG. 2 taken along the line 3—3 of FIG. 2; and FIGS. 4 and 5 are schematic views illustrating the operation of the adjustable strut for positioning digging wheels for lifting beets growing at various angles.

With reference to the drawings, it should first be pointed out that beets B raised in flat beds as shown in FIG. 4 grow generally vertically in the soil whereas beets B' as shown in FIG. 5 which are grown in elevated beds separated by irrigation ditches D tend to grow at an angle $a$ to the vertical and in a direction toward the nearest ditch. Thus pairs of beet-digging wheels W which are inclined to one another at a predetermined angle $x$ and whose median planes $p$ are disposed vertically as shown in FIG. 4 for picking up vertical beets B cannot efficiently pick up the tilted beets B' of FIG. 5, and in fact when such is attempted, the tilted beets will be severed and therefore only partially removed from the soil. In order to pick up every entire beet B' in a bed row, it therefore becomes necessary to dispose beet-digging wheels W' at angle of inclination $a$ to the vertical approximating the angle of inclination of beets B'.

The strut of my invention permits adjustment of the angle of inclination of median plane $p$ of each pair of digging wheels about a longitudinal axis through an easy adjustment of the strut itself about the same axis, thereby enabling the important lifting angle $x$ between the wheel of a pair to be maintained despite the adjustment. Thus wheels mounted on my adjustable strut are capable of lifting beets growing at any normally occurring angle on either side of the vertical as well as beets growing vertically, thereby eliminating the loss of many hundreds of pounds of beets during the harvesting of a bed row crop.

With reference now to FIGS. 1, 2 and 3, the adjustable strut of my invention, shown generally at 10, includes an elongate tubular main body portion 12 of generally rectangular cross section extending rearwardly and generally horizontally from a front cross frame member 14 of a beet harvester, assuming the harvester is traveling toward the left in FIG. 2. A pair of axle members 16, only one of which is shown in FIG. 2, extend at an inclination rearwardly and downwardly from opposite sides of the rear end of the main body 12 and are adapted for rotatably mounting the hubs 18 of a pair of beet-digging wheels 20 at the predetermined angle of inclination $x$ (FIG. 4) to one another. The outer ends of axles 16 are threaded at 22 for receiving nut members 24 which retain the lifting wheels on the axles. The usual scraper mounting bar 26 having a pair of upright mounting pins 28 at the opposite ends thereof is welded to the top rear portion of body member 12 for mounting a conventional scraper assembly (not shown) which is comomnly used for removing mud and debris from the beet-digging wheels as they revolve during the harvesting operation.

Body member 12 has a flanged forward end defining a swivel plate 30 which adjustably mounts the strut to the face of a vertical mounting plate 32 for forming part of a mounting bracket 34 rigidly secured to front cross frame member 14 of the harvester. A pair of upper gussets 31 and a pair of lower gussets 33 reinforce the preferably welded connection between the swivel plate and the remainder of body member 12. As shown best in FIG. 3, swivel plate 30 has a central opening 36 which receives a pivot pin 38 (FIG. 2) projecting forwardly from the abutting face of mounting plate 32 so as to permit swiveling movement of the strut about a horizontal pivot axis 40 extending longitudinally of body member 12 and of the harvester. The swivel plate is fastened to mounting plate 32 by three bolts 42 which extend through circular openings in the mounting plate and through three circumferentially spaced-apart arcuate slots 44 in the swivel plate. Arcuate slots 44 have a common center of curvature which coincides with the center of swivel plate opening 36 and therefore lies on pivot axis 40.

Thus, when loosened, fastenings 42 permit swiveling adjustment of the swivel plate and therefore the entire strut and wheel assembly about axis 40 within the limits of slots 44 so as to permit tilting adjustment of digging wheels 20. However, interengagement of pivot pin 38 and pivot opening 36 prevents any appreciable rectilinear movement of the swivel plate over the face of mounting plate 32 so that predetermined longitudinal, lateral and vertical positioning of the wheels is maintained.

As an example of the effect of the swivel plate adjustment, in FIG. 1 fasteners 42 are centered between the opposite ends of slots 44 so as to position median plane $p$ of the wheels vertically, whereas in the dashed line positions of wheels 20 in the same figure the median plane of the wheels is tilted with respect to the vertical at approximately the same angle $a$ as shown in FIG. 5 so as to position the wheels for lifting beets disposed at an angle toward the left as viewed in FIG. 5. By pivoting swivel plate 30 on pivot pin 38 in the opposite direction, the wheels 20 could be tilted in the opposite direction to pick up beets growing toward the right as viewed in FIG. 5. In any event it is important that the entire strut assembly pivots about longitudinal axis 40 so that preset lifting angle $x$ between the wheels is not disturbed during adjustment of the inclination of their median plane.

In addition to vertical mounting plate 32 mounting bracket 34 is composed of a horizontal bottom plate 46 joined as by welding to plate 32 at right angles thereto so that the two plates fit against the rear and bottom faces, respectively, of front cross frame member 14. The two plates are clamped to frame member 14 by a pair of eye bolts 48 which extend across the top of the frame member and through openings in mounting plate 32, and by a pair of vertical bolts 50 which extend through the eyes of the eye bolts and through openings in lower plate 46. In this manner, the plates and thus the strut may be secured rigidly to cross frame member 14 at any desired position therealong.

With reference again to FIG. 3, a pair of tapped holes are provided in the opposite lower lateral edges of swivel plate 30, and such holes open into the lower pair of arcuate slots 44. A pair of set screws 52 are threaded through such openings and into abutment with adjusting bolts 42 so as to prevent the swivel plate from being knocked out of adjustment in the event the digging wheels should strike rocks or the adjusting bolts should work loose. It is important that the tapped holes be so aligned with the slots that the set screws will abut the adjusting bolts in all positions of the bolts in their slots.

Several features of the illustrated strut offer advantages over other possible modifications of the same, although such features might not be absolutely essential to an operable strut. One such feature is the positioning of longitudinal pivot axis 40 between wheels 20 and in median plane $p$, which has the effect of minimizing any vertical movement of the wheels upon tilting of the same about such axis. A feature minimizing lateral displacement of the lower edges of the wheels upon tilting adjustment of such wheels about axis 40 is the projection of the strut horizontally in the direction of the axis rather than downwardly therefrom. A related feature contributing to the same effect is the projection of axis 40 through the strut rather than above it. Of course, the closer pivot axis 40 can be positioned to the lower wheel periphery, the less will be the vertical and lateral displacement of such periphery for any given tilting adjustment of the strut, and this fact is taken into account in the illustrated embodiment.

In operation several pairs of beet-digging wheels 20 are mounted on cross frame member 14 of the harvester for picking up beets in several rows at the same time. If the harvester were harvesting beets growing in flat beds, as shown in FIG. 4, all of the strut would be adjusted in their vertical positions so that the median planes of the beet-digging wheels would be disposed vertically. However, when harvesting beets growing in bed rows as shown in FIG. 5, a pair of adjacent struts would be tilted in opposite directions from the vertical with the strut on the left as viewed in FIG. 5 being tilted toward the left so that the left-hand pair of beet-digging wheels would be disposed for picking up beets in the left-hand bed row whereas the right-hand strut of a pair would be tilted correspondingly for picking up beets in the right-hand bed row.

From the foregoing it will be apparent that the illustrated construction provides a strut which is adjustable for picking up beets growing at any normally occurring angle with respect to the vertical and which can be adapted for mounting on any type or make of beet harvester. It will also be quite apparent that through the use of an adjustable strut like that shown, crop losses and damage during harvesting can be reduced to a minimum.

Having illustrated and described a preferred form of my invention, it should be apparent to those skilled in the art that the invention permits of modification in arrangement and detail. It is my intention not to be limited to my preferred form and to claim as my invention all such modifications as come within the true spirit and scope of the following claims.

I claim:

1. An adjustable mount for a pair of crop-digging and lifting wheels of a row crop harvester extending longitudinally in the direction of travel of said harvester, said mount comprising:

a wheel support member including means for rotatably mounting on said member of pair of said digging wheels in a predetermined angular relationship to one another, mounting means for rigidly mounting said member on the frame of said harvester so that said pair of digging wheels are disposed in a generally upright relationship to the ground surface for lifting individual plants in a row and with the axes of rotation of said wheels extending at an angle to the direction of travel of said harvester, said mounting means including means permitting bodily pivotal movement of said member about an axis extending in the direction of travel of said harvester so as to adjust the angular relationship of said wheels with respect to the plants to be harvested while maintaining said predetermined angular relationship between said wheels, and means for securing said member in an adjusted position wherein said member is held against movement about said axis during the harvesting operation.

2. Apparatus according to claim 1 wherein said mounting means include means preventing any substantial rectilinear movement of said member relative to said harvester frame in a plane normal to said axis during pivotal adjustment of said member about said axis.

3. Apparatus according to claim 1 wherein said mounting means includes a mounting plate and means for rigidly securing said plate to the frame of a harvester, a swivel plate forming a rigid part of said member, and cooperative means interconnecting said plates and permitting swiveling movement of said swivel plate relative to said mounting plate about said pivot axis while resisting rectilinear movement of said swivel plate in a plane parallel to the plane of said mounting plate.

4. Apparatus according to claim 3 wherein said cooperative means includes a pivot pin on one of said plates and a pin-receiving opening in the other of said plates.

5. Apparatus according to claim 4 wherein said cooperative means includes arcuate slot means in one of said plates, and said securing means includes fastening means extending through said slot means from the other of said plates for securing said plates together.

6. Apparatus according to claim 5 wherein said arcuate slot means includes a plurality of arcuate slots in one of said plates, said slots having a common center of curvature lying on the pivotal axis of said member.

7. Apparatus according to claim 1 wherein said member includes an elongate body,
   a pair of wheel-mounting arms extending in a predetermined angular relationship to one another in generally opposite directions transversely from one end of said body,
   flange means at the opposite end of said body defining a swivel plate having a broad face normal to said pivot axis,
   a mounting plate including means for rigidly securing said mounting plate to the frame of said harvester in a disposition for abutting the broad face of said swivel plate,
   cooperative means on said mounting plate and said swivel plate permitting swiveling movement of said body about a pivot axis extending lengthwise through said body while preventing any substantial rectilinear movement of said body relative to said mounting plate in a plane normal to said pivot axis,
   and fastener means for selectively securing said swivel plate to said mounting plate so as to prevent said swiveling movement,
   whereby said digging wheels can be tilted about said axis while the predetermined relationship between said wheels as determined by said arms is maintained.

8. In a harvester implement having a pair of crop-digging wheels disposed in a predetermined side-by-side angular relationship to one another, with the longitudinal median plane between said wheels extending longitudinally of said harvester and normally vertically, an adjustable mounting for said wheels comprising:
   a wheel-mounting member rotatably supporting said pair of wheels in said predetermined angular relationship,
   means mounting said member to said harvester including adjustment means permitting bodily swiveling movement of said member about a pivot axis extending longitudinally of said harvester and between said wheels so that said median plane forms an oblique angle to the vertical and while maintaining said predetermined angularity between said wheels,
   and means for selectively securing said member in various adjusted positions thereof with respect to said axis,
   whereby said wheels can be tilted with respect to said longitudinal axis without changing the angular relationship between said wheels.

9. Apparatus according to claim 8 wherein said pivot axis lies in said longitudinal median plane between said wheels,
   said wheel-mounting member being elongate in the direction of said pivot axis.

10. Apparatus according to claim 9 wherein said pivot axis and member extend horizontally.

11. Apparatus according to claim 1 including locking means operable after said securing means has secured said member in its adjusted position for locking said member in said adjusted position during the harvesting operation.

12. Apparatus according to claim 5 including locking means for preventing swiveling movement of said swivel plate, said locking means including a pair of set screw means extending into lateral abutment with said fastening means within said slot means.

References Cited

UNITED STATES PATENTS

| | | | |
|---|---|---|---|
| 1,611,825 | 12/1926 | Farrington | 171—57 XR |
| 2,888,081 | 5/1959 | Hammer et al. | 171—58 |

ANTONIO F. GUIDA, *Primary Examiner.*